United States Patent [19]
Cosenza

[11] Patent Number: 4,563,119
[45] Date of Patent: Jan. 7, 1986

[54] HOOK CUTOUT FOR TANGLESS HELICALLY COILED INSERT

[75] Inventor: Frank J. Cosenza, San Pedro, Calif.

[73] Assignee: Rexnord Inc., Brookfield, Wis.

[21] Appl. No.: 581,839

[22] Filed: Feb. 21, 1984

[51] Int. Cl.⁴ ............................................. F16B 37/12
[52] U.S. Cl. ...................................... 411/438; 10/1 A
[58] Field of Search ............... 411/178, 250, 251, 252, 411/438, 929.1; 10/1 A

[56] References Cited

U.S. PATENT DOCUMENTS 2,363,789 11/1944 Haas .................................... 411/438
2,586,007 2/1952 Cram et al. ......................... 411/438

FOREIGN PATENT DOCUMENTS 128631 8/1948 Australia ............................... 10/1 A
833573 3/1952 Fed. Rep. of Germany ...... 411/438

Primary Examiner—Thomas J. Hoiko

[57] ABSTRACT

A helically coiled wire insert of the type used for tapped holes in parent material that is generally softer than the bolt being screwed into the tapped hole, whereby the two free end coils have a hook recess on the inner screw thread of each and the terminal end of each free end coil has a reduced transverse cross section along one longitudinal axis of the wire. The surfaces of the hook recess are angled from the longitudinal axis of the insert to provide increased forces along the longitudinal axis of the insert.

1 Claim, 8 Drawing Figures

HOOK CUTOUT FOR TANGLESS HELICALLY COILED INSERT

BACKGROUND OF THE INVENTION

This invention relates to wire coil screw thread inserts for tapped holes of workpieces and, more particularly, to an improved tangless wire coil insert.

The conventional wire coil screw thread insert is provided, at one of its ends, with a diametrical tang of its end convolution so arranged that the tang can be gripped by a special tool projected through the coil for insertion of the wire coil insert into a tapped hole. The tang must be broken off and removed after the insertion of the coil insert because the tang would prevent a bolt from being screwed through the coil. Accordingly, a notch is provided on the inside of the end convolution of the coil so that the tang of the coil insert may be broken off. It is evident from such previously known devices, that the broken tang must be accounted for in certain critical applications, e.g. in electronic equipment in which the loose metal tang could cause an electrical short or in internal combustion engines where the loose metal tang could cause engine failure. Further, the extraction of prior art inserts required the use of an extracting tool which cut into the inner threads of the insert and thus rendered the insert unusable for further service.

Further, the problem with prior art inserts, such as tangless inserts as described in U.S. Pat. No. 2,363,789 is that they require the one end convolution having the recessed hook means therein to project inwardly to avoid the possibility of causing burrs or otherwise injuring the tapped thread during the insertion of the helically coiled insert. Also, the extraction of these tangless coil inserts which must be done by using a knife-edge tool damages the inner threads so that the insert cannot be reused.

The method used for inserting a prior art wire coil insert into a tapped hole required an operator to manually orientate the insert to be able to apply a torque to the lead end of the coiled insert during the insertion, since the tang or recessed hook means was only at one end of the insert.

Thus, there exists a need for a double-ended tangless wire coil screw thread insert which can be inserted into the parent material in either direction, without regard to orientation, and can be subsequently removed without damage to the insert and does not require the accountability of broken tangs.

SUMMARY OF THE INVENTION

The present invention is directed to a tangless helically coiled insert, and is summarized in the following objects:

First, to provide an insert which an operator may install without orientating the insert in one particular direction with respect to the ends.

Second, to provide an improved insert which will permit easy insertion thereof and prevent galling of the parent material.

Third, to provide an insert having recessed hook means at both free end coils to facilitate insertion and removal of the insert without damage to the insert or the parent material.

Fourth, to provide an insert whereby no secondary operations are required to remove and account for an unnecessary tang.

Fifth, to provide an insert having recessed hook means at both free end coils, whereby the camming surface of the hook means, along the longitudinal length of the wire, is at an angle to the vertical along the longitudinal length of the wire in order that the pawl or gripper means of the installation tool will provide a force along the longitudinal axis of the insert. The force along the longitudinal axis of the insert keeps the free end coil in close proximity to the next adjacent convolution of the insert.

Sixth, to provide an insert having recessed hook means at both free end coils with a lead surface that has an angle to the vertical along the transverse width of the wire to provide a force along the longitudinal axis of the insert when the hook means is engaged with the pawl or gripper means of an installation tool.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
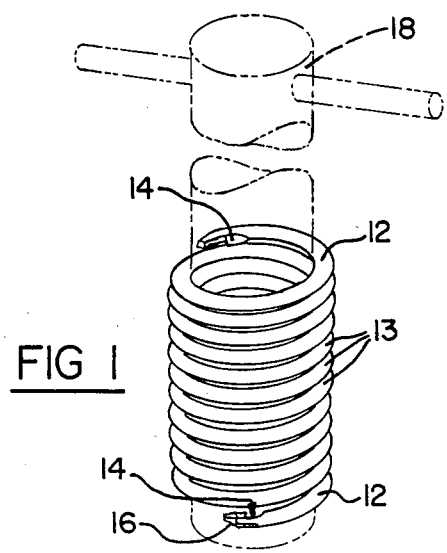
FIG. 1 is a perspective view of a tangless helical coil insert made in accordance with the present invention.

The present invention is particularly adapted for use in instances where a steel alloyed bolt having conventional threads is desired to be fastened into a material of relatively softer alloy, such as aluminum. The tapping of the threaded hole in the parent material will not ordinarily provide a sufficiently firm fastening means. Accordingly, a helically coiled insert of material similar to the bolt is inserted in the tapped hole to provide adequate locking means in order that the bolt may be inserted and removed repeatedly without doing severe damage to the parent material.

In accordance with the present invention, as shown in the drawings, there is depicted a helical coil insert 10 which is wound having any degree of advance corresponding to the advance for a particular threaded member with which it is designed to cooperate. Thus, for various thread sizes and for various diameters of threaded members, the insert 10 may have slightly different dimensions. Although the preferred embodiment shows a wire coil having a generally diamond-shaped cross-section, it is to be understood that the invention is applicable to coils of wire cross-section of any form such as square, round, or triangular. What is important, however, is that both free end convolutions 12 are so formed that they constitute a recess or grip means 14 formed from an angled surface 29 along the longitudinal length of the wire and/or an angled lead surface 28 along the transverse dimension of the wire, for a suitable insertion and extraction tool.

When the insert 10 is to be inserted in a tapped hole, or a boss, or nut, the tool is first inserted into the insert from either free end 12 so that a pawl or gripper portion, which pivots from the tool 18, engages the recess 14 of the insert 10 which, then, may be screwed by means of the tool 18 into the tapped hole. The pivotal pawl has an angled surface complimentary to the angled surface of the recess 14 to ensure proper contact of the mating surfaces. In certain smaller sizes of inserts it has been found necessary to use a special tool having a prewinder sleeve in which the insert is first placed, without regard to orientation, so that the insert can be reduced in diameter prior to being screwed into the tapped hole. In screwing the insert 10 into the tapped hole, the torque applied by the tool to the recess 14 will generally cause a contraction of the free end convolution 12 and, at the same time, a force having a component along the longitudinal axis of the insert which tends to keep the free end convolution in contact with the next convolution of the insert, so that during the insertion, first, the terminal end 16 will enter the tapped hole whereupon the free end convolution 12 and the remaining convolutions 13 of the insert body will follow. When the torque is relieved, the coil convolutions will expand to be firmly seated in the tapped thread. The seating of the free end convolution 12 in the tapped thread will prevent, when screwing a bolt into the insert 10, the danger of the bolt taking the insert 10 along if the friction between the bolt and the recess 14 is very high.

Figure 2:
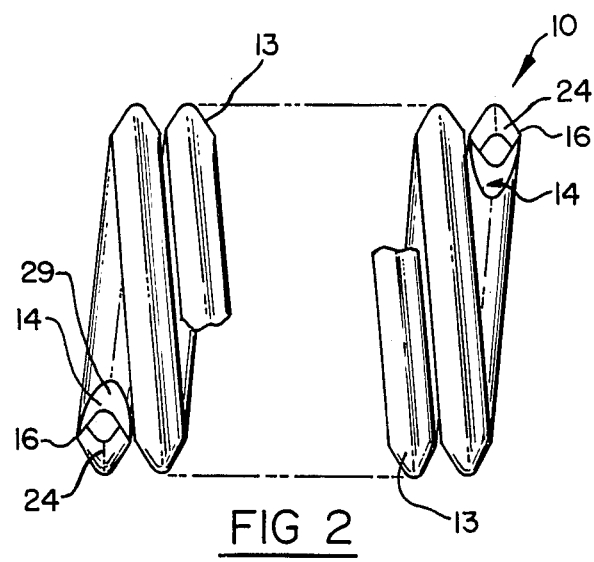
FIG. 2 is a side elevation of the insert of FIG. 1.
Figure 3:
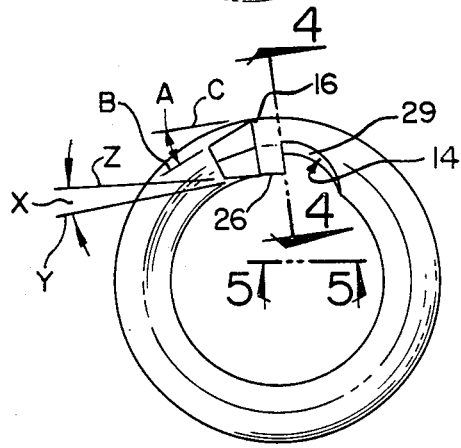
FIG. 3 is a front elevation view of the insert of FIG. 2.
Figure 6:
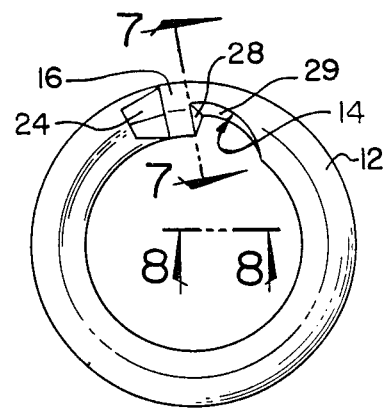
FIG. 6 is a front elevation view of another embodiment of the present invention.
Figure 4:
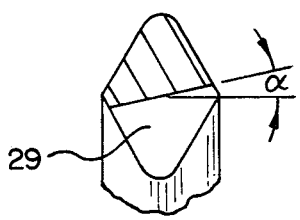
FIG. 4 is a sectional view taken along line 4—4 of FIG. 3.

A terminal end 16 of the free end convolutions 12 constructed in accordance with a preferred embodiment of the invention is illustrated in FIGS. 2, 3 and 6. A truncated portion or free end, being slightly reduced along the longitudinal axis of the wire forms the terminal end 16 at both free end convolutions 12. The truncated ends are preferably formed with an angle A between 10°–15° included between a line B tangent to the rear portion of the truncated end 24 and a line C formed by the outer crest of the diamond-shaped wire. A lesser angle X is included between a line Y tangent to the inner circumference at the rear portion 24 of the truncated end and a line Z coextensive with the inner crest 26 of the diamond-shaped wire. The purpose of the truncated portion of the terminal end 16 of the insert is to prevent sharp edges from shaving metal during installation of the insert into a tapped hole. The truncated portion also permits the installation tool to be reinserted in an inserted coil or permits an extraction tool to be inserted in a coil to be removed.

The terminal end 16 of the insert 10 may be rounded off in the form of a truncated cone. Again, this configuration would prevent sharp edges from shaving metal from the parent material during installation of the insert into a tapped hole.

Figure 5:
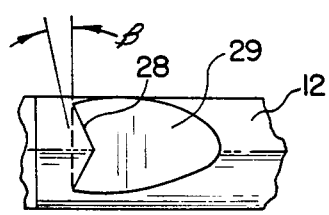
FIG. 5 is a sectional view taken along line 5—5 of FIG. 3.

Referring again to FIG. 3, there is shown a recess 14 which receives an outwardly biased pawl (not shown) from the extraction tool or insertion tool 18 which provides the necessary torque to screw the insert 10 into or out of the parent material. The recess 14 has a lead wall portion 28 generally raked between 5°–15° from a vertical transverse plane as seen in FIGS. 3 and 5. This angular rake insures that the gripper pawl of the insertion tool 18 is fully inserted into the recess 14 in order to cause a torsional force on the free end convolution 12 so that the free end convolution 12 will be contracted during the insertion of the helically wound insert 10. As illustrated in FIGS. 3–8, the camming surface 29 of the recess 14 is kept to a minimum to increase the bolt surface strength area for an inserted bolt, thus reducing pullout of the bolt. The camming surface 29 is further cut or machined to provide an angled surface $\alpha$ with respect to the longitudinal axis of the wire. This angled cut is generally between 2°–20° whereas, in FIGS. 3–5, the angle of the lead wall portion is 0°.

Figure 7:
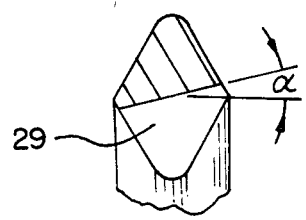
FIG. 7 is a sectional view taken along line 7—7 of FIG. 6.
Figure 8:
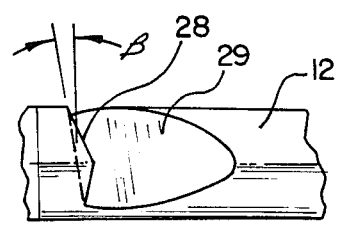
FIG. 8 is a sectional view taken along line 8—8 of FIG. 6.

In the embodiment of FIGS. 6–8 the recess 14 also has an angled lead wall portion 28. The lead wall portion forms an angle $\beta$ with respect to the vertical axis or the transverse dimension of the wire. This angled cut is generally between 2°–20°.

The insert of the present invention results in a helically coiled insert which is readily adaptable to fully automatic operations since the insert 10 can be inserted with either free end convolution being the lead thread and insures a stronger insert with less pullout.

As seen in FIGS. 3–8, the camming surface may be angled while the lead wall may be straight cut, or both the camming surface and the lead wall may be angled. Further, the lead wall may be angled while the camming surface may be straight cut. However, the angled recess 14, which mates with a corresponding angled surface on the pawl of a tool, provides an axial force component along the longitudinal axis of the insert, thereby providing an increase in force to contract the lead coil and keep the lead coil in contact with the next convolution of the insert.

Finally, it will be clear that the two free end convolutions 12, each with a recess 14, will permit removal of the insert 10 from the parent material by inserting an extraction tool into the insert 10 in order that the pawl of the tool engages the recess 14 opposite the recess used to insert the coiled insert 10. Again, the torque applied to the insert 10 by the tool in the opposite direction for insertion will cause contraction of the free end convolution during removal of the insert.

I claim:
1. A screw thread insert comprising a substantially cylindrical body of a helically wound wire, said body forming an inner and outer screw thread, and two free end coils being generally located in the transverse plane of said cylindrical body, each said free end coil having a hook means recess on said inner screw thread for engagement with an installation tool, and a terminal end on each said free end coil being slightly reduced along the longitudinal axis of said wire so that during insertion the outer screw thread adjacent said tapered terminal end first contacts the parent material, said hook means recess having a camming surface coincident with the crest of the inner thread and a lead surface transverse to the crest of the inner thread, said camming surface formed at an angle to the longitudinal axis of the wire and the lead surface formed at an angle to the transverse vertical plane of the wire.

* * * * *